(12) United States Patent
Yamazaki et al.

(10) Patent No.: US 8,903,578 B2
(45) Date of Patent: Dec. 2, 2014

(54) HYBRID VEHICLE CONTROL UTILIZING GRADE DATA

(75) Inventors: Mark Steven Yamazaki, Canton, MI (US); Walter Joseph Ortmann, Saline, MI (US); Marvin Paul Kraska, Dearborn, MI (US); Daniel Scott Colvin, Farmington Hills, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 10 days.

(21) Appl. No.: 13/465,320

(22) Filed: May 7, 2012

(65) Prior Publication Data

US 2013/0297106 A1   Nov. 7, 2013

(51) Int. Cl.
| | |
|---|---|
| B60L 9/00 | (2006.01) |
| B60L 11/00 | (2006.01) |
| G05D 1/00 | (2006.01) |
| G05D 3/00 | (2006.01) |
| G06F 7/00 | (2006.01) |
| G06F 17/00 | (2006.01) |
| B60W 20/00 | (2006.01) |

(52) U.S. Cl.
CPC ............. B60W 20/00 (2013.01); *Y10S 903/902* (2013.01); *Y02T 10/6286* (2013.01)
USPC .................. 701/22; 701/62; 701/65; 903/902

(58) Field of Classification Search
CPC ........................... B60W 20/00; Y10S 903/902
USPC .................................................. 701/22, 62, 65
See application file for complete search history.

(56) References Cited

U.S. PATENT DOCUMENTS

| | | | |
|---|---|---|---|
| 5,893,894 A * | 4/1999 | Moroto et al. .................. 701/53 |
| 7,331,899 B2 * | 2/2008 | Ortmann et al. .................. 477/6 |
| 7,398,154 B2 * | 7/2008 | Phuyal et al. ................. 701/409 |
| 8,095,290 B2 * | 1/2012 | Smyth et al. .................. 701/102 |
| 8,396,618 B2 * | 3/2013 | Cikanek et al. ................. 701/22 |
| 2005/0209775 A1 * | 9/2005 | Entenmann .................. 701/208 |
| 2010/0145559 A1 * | 6/2010 | Gauthier et al. ................ 701/22 |
| 2010/0256883 A1 * | 10/2010 | Sauter ............................. 701/65 |
| 2010/0268436 A1 | 10/2010 | Soejima et al. |
| 2011/0112708 A1 | 5/2011 | Fassnacht |
| 2011/0213517 A1 * | 9/2011 | Laws et al. ...................... 701/22 |
| 2012/0265382 A1 * | 10/2012 | Nefcy et al. ..................... 701/22 |
| 2013/0035829 A1 * | 2/2013 | Tiberg ............................. 701/56 |
| 2013/0138282 A1 * | 5/2013 | Shin et al. ....................... 701/22 |

* cited by examiner

*Primary Examiner* — Calvin Cheung
*Assistant Examiner* — Paula L Schneider
(74) *Attorney, Agent, or Firm* — David B. Kelley; Brooks Kushman P.C.

(57) ABSTRACT

A method of controlling a hybrid vehicle having a step ratio transmission is disclosed. The method utilizes terrain data to reduce the number of shift events. The method comprises receiving data indicative of a grade profile of an anticipated route, identifying a forecast shift sequence comprising a forecast downshift event and an adjacent forecast upshift event, and adjusting the shift criteria based on the time between the forecast shift events, the road grade between the forecast shift events, and the state of a storage battery.

20 Claims, 8 Drawing Sheets

HYBRID VEHICLE CONTROL UTILIZING GRADE DATA

TECHNICAL FIELD

The present disclosure relates to a method for scheduling ratio changes in a hybrid vehicle having a step ratio automatic transmission. More particularly, the present disclosure describes use of information describing terrain along the projected vehicle route to reduce the number of shifts.

BACKGROUND

Many vehicles employ step ratio transmissions to transfer power between an internal combustion engine and the vehicle wheels. Step ratio transmissions provide a discrete set of speed ratios between the engine and the wheels. In an automatic transmission, a controller selects the transmission ratio in response to the vehicle speed and a driver demand, usually communicated by depressing an accelerator pedal. High speed, low demand situations call for a low speed ratio such that the engine operates most efficiently. Low speed, high demand situations call for a high speed ratio because so the engine operates at the speed at which it can generate the most power. As the conditions change, the transmission must shift between speed ratios. Vehicle occupants may feel these shifts and may be annoyed if these shifts occur too frequently.

In a modular hybrid transmission (MHT) architecture, the vehicle also has a traction motor connected at the input of the transmission. The traction motor is electrically connected to a battery. The motor may be used in either a motoring mode in which energy from the battery is used to supplement the engine power or in a generating mode in which the motor converts mechanical energy into electrical energy which is stored in the battery.

SUMMARY

Many vehicles are now equipped with Global Positioning System units and extensive databases describing roads and points of interest. Traditionally, GPS units have primarily been used to provide information directly to the driver. This disclosure describes a method by which information from a GPS or other comparable source is utilized directly by the vehicle controller to influence the scheduling of shift events.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
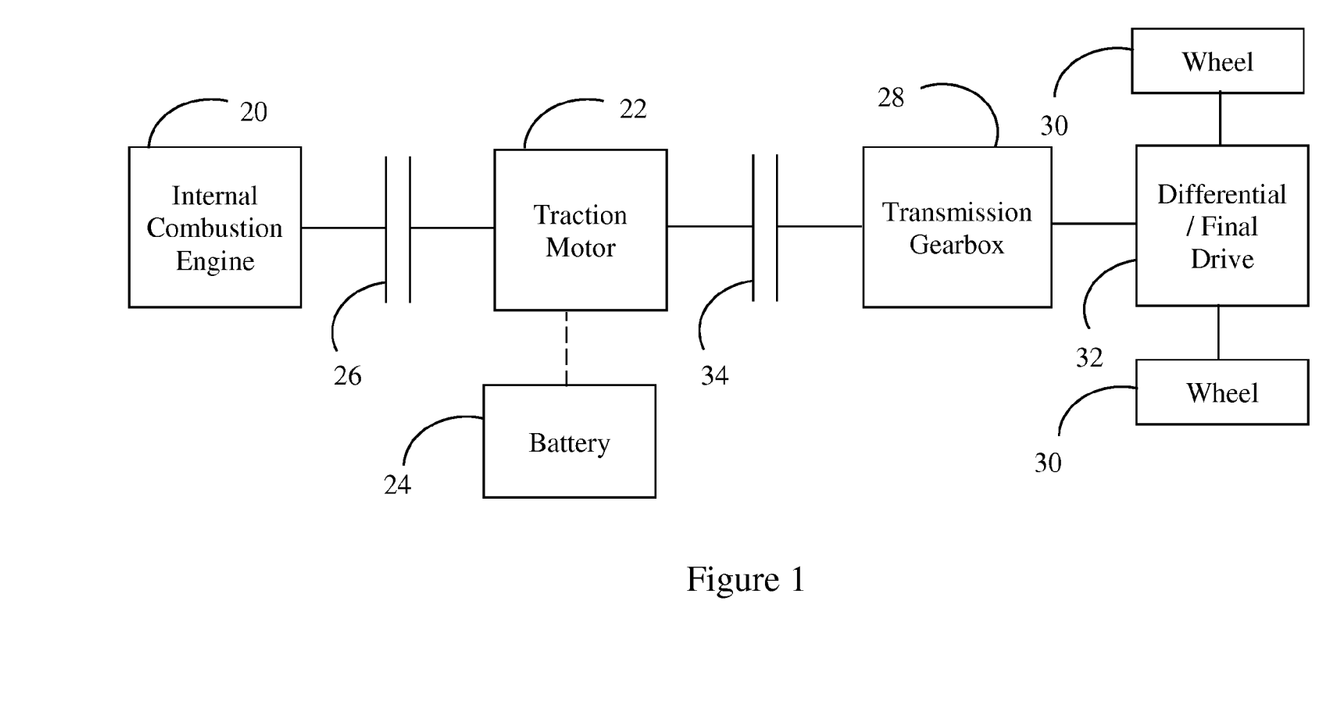
FIG. 1 is a schematic diagram of a hybrid vehicle with a modular hybrid transmission.

FIG. 1 illustrates a vehicle with a modular hybrid transmission. Internal combustion engine 20 provides the majority of the tractive torque during steady state operation. Traction motor 22 adds supplemental torque during transient events. Traction motor 22 is electrically connected to battery 24. Internal combustion engine 20 and traction motor 22 are mechanically connected by disconnect clutch 26. Torque from the engine 20 and traction motor 22 are transferred by transmission gearbox 28 and differential 32 to a set of driving wheels 30. The transmission gearbox 28 selectively engages one of a number of available transmission ratios such that the engine operates at an efficient speed over a wide range of vehicle speeds. The differential 32 permits the outside wheel to rotate slightly faster than the inside wheel as the vehicle turns a corner. Finally, launch clutch 34 disconnects the engine and traction motor from the wheels while the vehicle is stationary so the engine can idle. To launch the vehicle, launch clutch 34 is gradually engaged.

Figure 2:
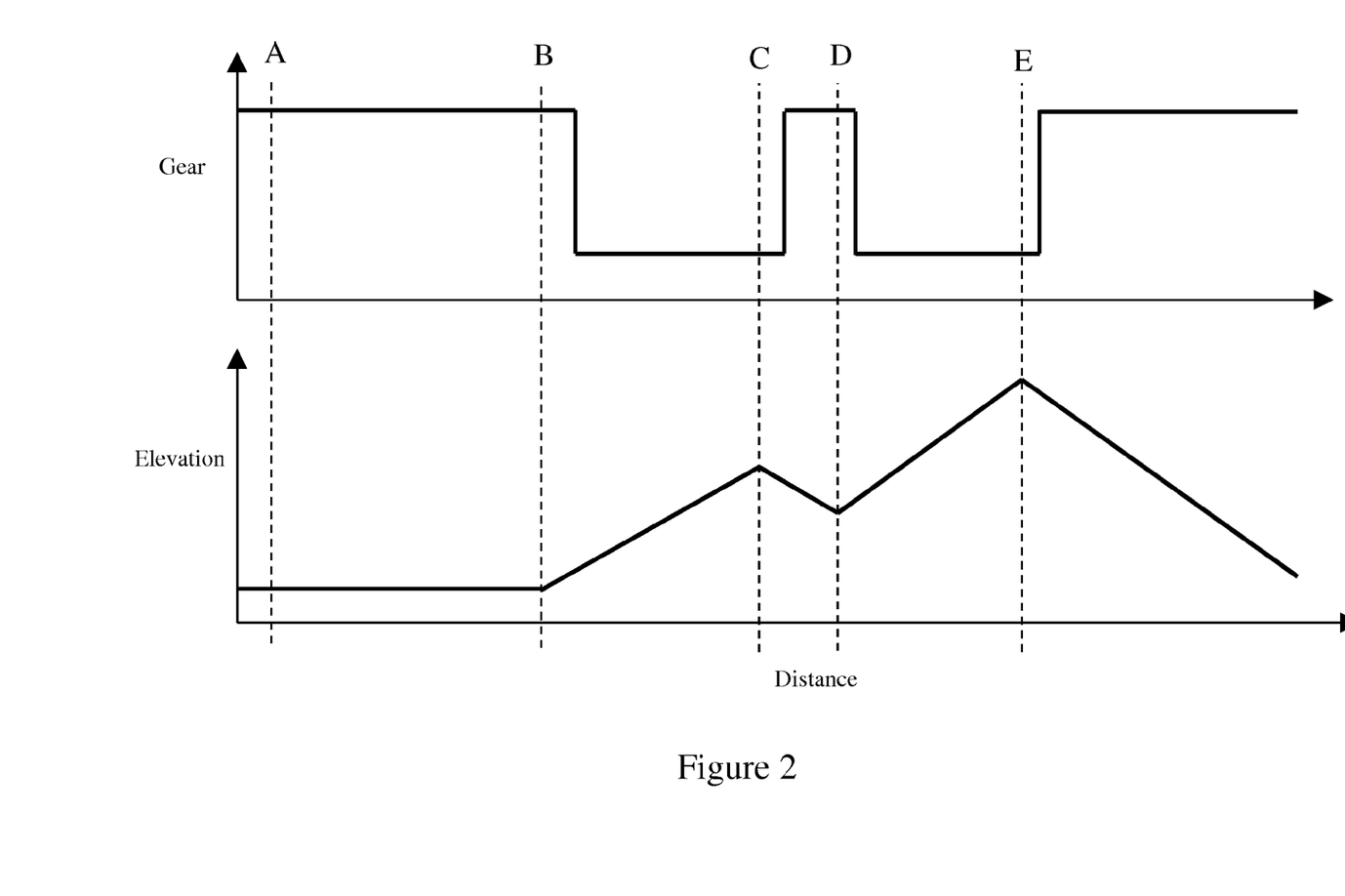
FIG. 2 is a graph illustrating an example pattern of shifting for a vehicle.

FIG. 2 illustrates the behavior of a non-hybrid vehicle on hilly terrain. In this example scenario, two moderate length uphill grades are separated by a short downhill grade. Highway fuel economy is optimized by selecting gear ratios such that the engine speed in top gear is just high enough for the vehicle to be able to cruise in top gear on level ground. When the vehicle encounters uphill grades, as shown at point B, the vehicle must downshift in order for the engine to generate enough power to maintain vehicle speed. When the vehicle crests the hill at point C, the transmission automatically upshifts into top gear. Soon thereafter, at point D, the vehicle must downshift again in order to ascend the second hill. This frequent shifting is annoying to many drivers.

Figure 3:
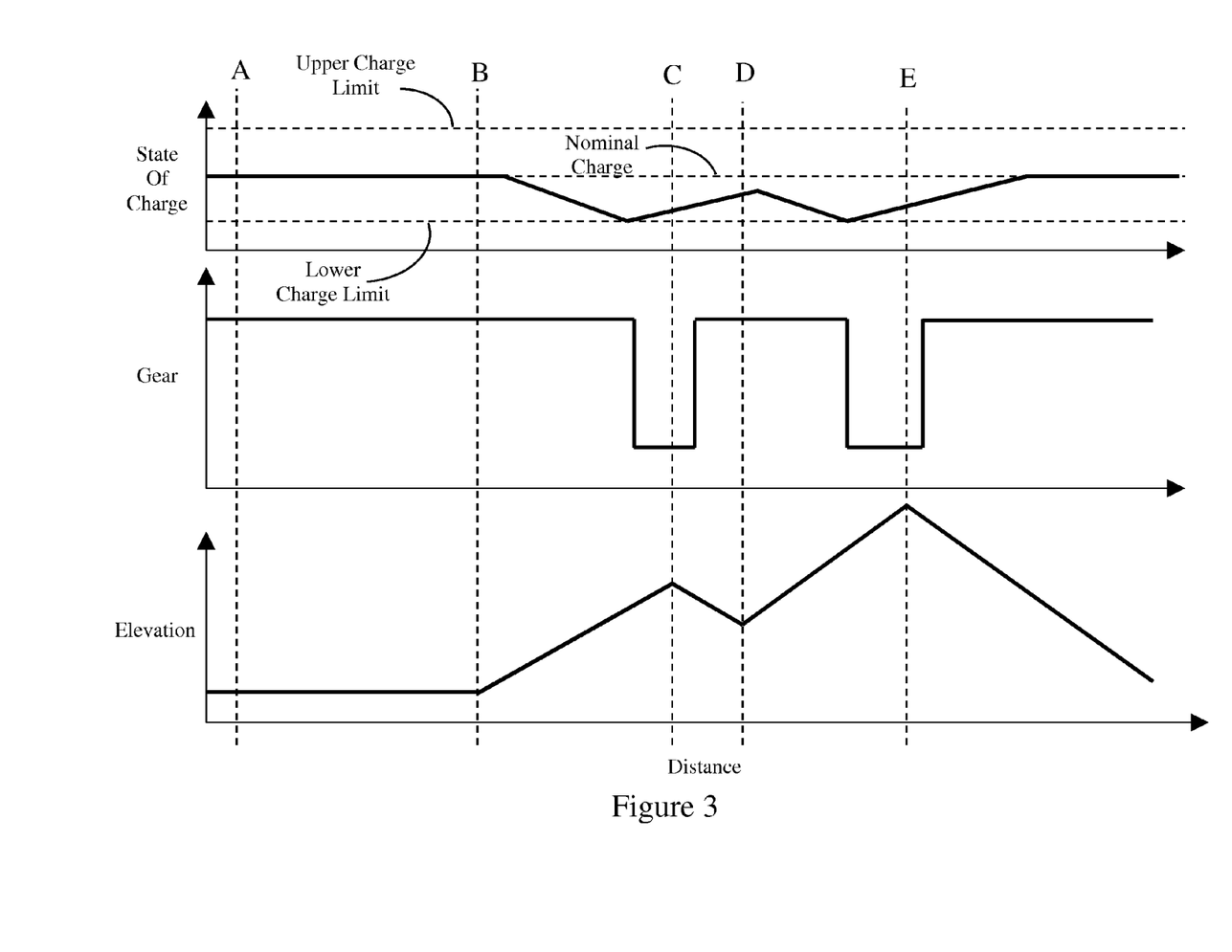
FIG. 3 is a graph illustrating an example pattern of shifting for a hybrid vehicle with a step ratio transmission using only present state information.

A hybrid electric vehicle equipped with an electric traction motor can reduce the number of shifts required. Instead of immediately downshifting in response to the increased power demand associated with an uphill grade, the hybrid vehicle can supplement the engine power with the traction motor. For short hills, no downshift will be required. For longer hills however, a downshift will be required when the state of charge of the battery is depleted. This is illustrated in FIG. 3. On the level ground between points A and B, the state of charge is maintained at a nominal level between an upper and lower limit. As the vehicle climbs the hill between B and C, the traction motor and battery supplement engine power, delaying a downshift, but not preventing it. Like the non-hybrid, the hybrid vehicle upshifts on the short downhill grade between C and D. Then, the process is repeated on the second hill.

Figure 4:
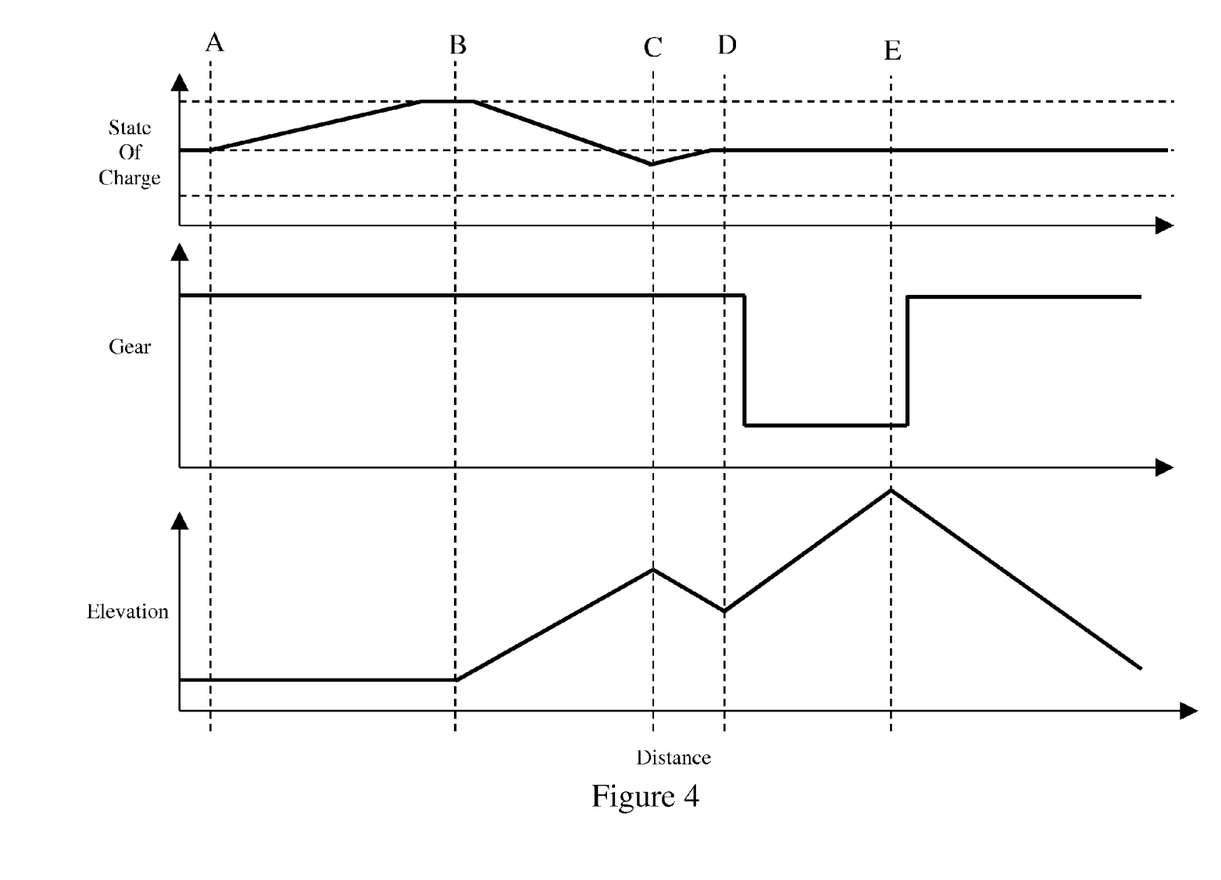
FIG. 4 is a graph illustrating an example pattern of shifting for a hybrid vehicle with a step ratio transmission using predictions of future grade.

The hybrid can be more effective in reducing shift events by utilizing information about upcoming terrain in addition to utilizing present conditions. One such scenario is illustrated in FIG. 4. At point A, the vehicle responds to information about the first hill by operating the traction motor as a generator and increasing the state of charge of the battery to near its upper limit. The engine must provide some additional power to ensure that the wheel torque remains at the level demanded by the driver. As a consequence of the additional charge, the vehicle is able to ascend the first hill without downshifting. When the vehicle encounters the second hill, however, it does not have enough stored energy in the battery to avoid a downshift. Unlike the example in FIG. 3, however, the vehicle can determine at point D that it will need to downshift, so it does not expend battery energy delaying this downshift.

Figure 5:
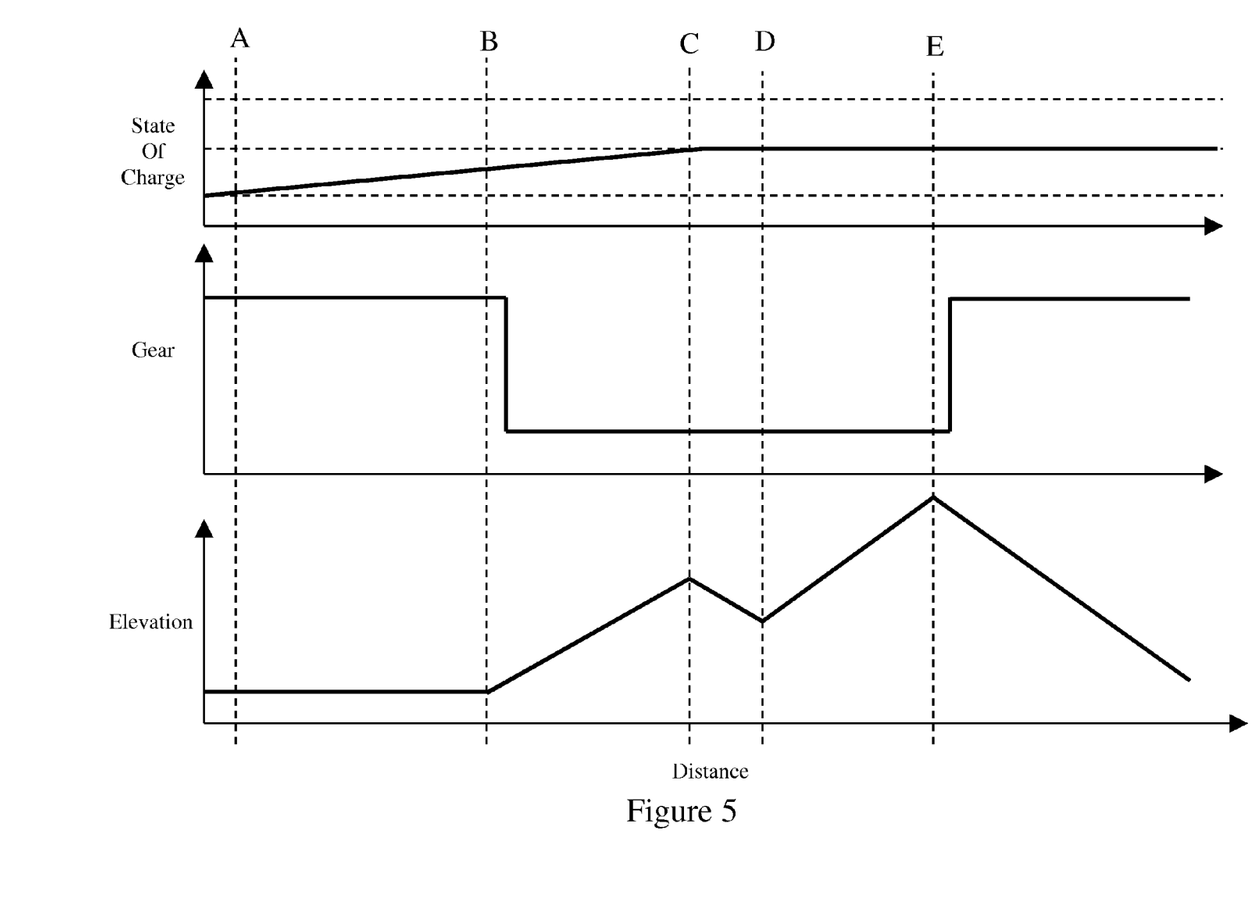
FIG. 5 is a second graph illustrating an example pattern of shifting for a hybrid vehicle with a step ratio transmission using predictions of future grade.

Another example is illustrated in FIG. 5. In this example, the state of charge at point A is near the lower limit due to past events. The vehicle utilizes information about the uphill grade between B and C to determine that a downshift is necessary and executes that downshift near point B. As the vehicle crests the first hill at point C, it utilizes information about the terrain to determine that it will need to be in the lower gear to climb the second hill. Utilizing this information, it inhibits the upshift that would normally occur at point C, remaining in the lower gear instead.

Figure 6:
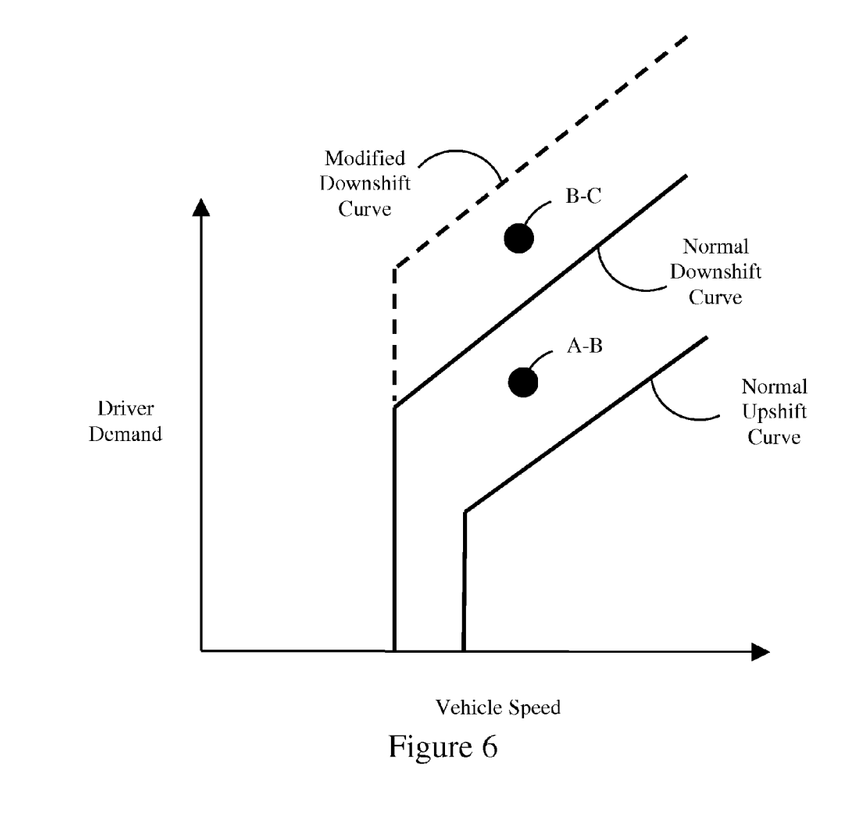
FIG. 6 is an illustration of the shift curves employed to produce the pattern of shifting illustrated in FIG. 4.
Figure 7:
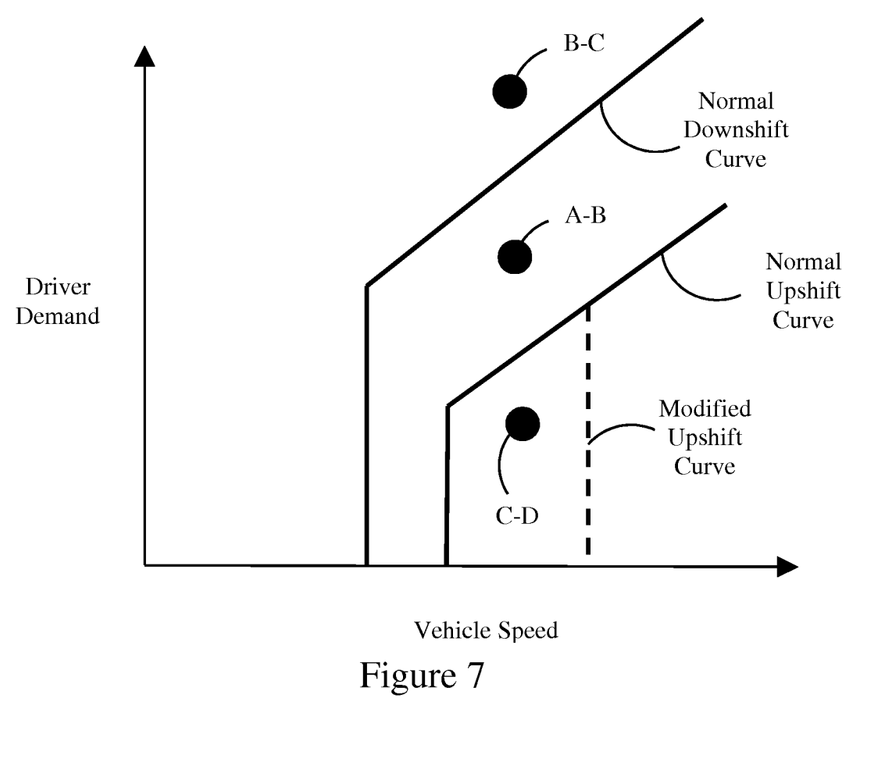
FIG. 7 is an illustration of the shift curves employed to produce the pattern of shifting illustrated in FIG. 5.

The modifications to the shift criteria are illustrated in FIGS. 6 and 7. At any point in time, the vehicle is operating at a particular vehicle speed and driver demand which corresponds to a point in the graphs on FIGS. 6 and 7 called the operating point. A downshift occurs when the operating point crosses the downshift curve from the lower right region of the graph to the upper left region of the graph. In the circumstances illustrated in FIG. 6, the operating point changes at B as a result of the driver demanding additional power to climb the hill. If the normal downshift curve is used, this would initiate a downshift. However, when hybrid vehicle has enough stored battery energy to climb the hill without shifting, the strategy uses the modified downshift curve instead and the downshift is inhibited. In the circumstances illustrated in FIG. 7, the operating point changes at C as a result of the driver demanding lifting his foot off the accelerator pedal after cresting the hill. Since the operating point moves to the opposite side of the normal upshift curve, this would normally initiate an upshift. However, when vehicle recognizes that another hill is a short distance ahead, the strategy uses the modified upshift curve instead and the upshift is inhibited.

Figure 8:
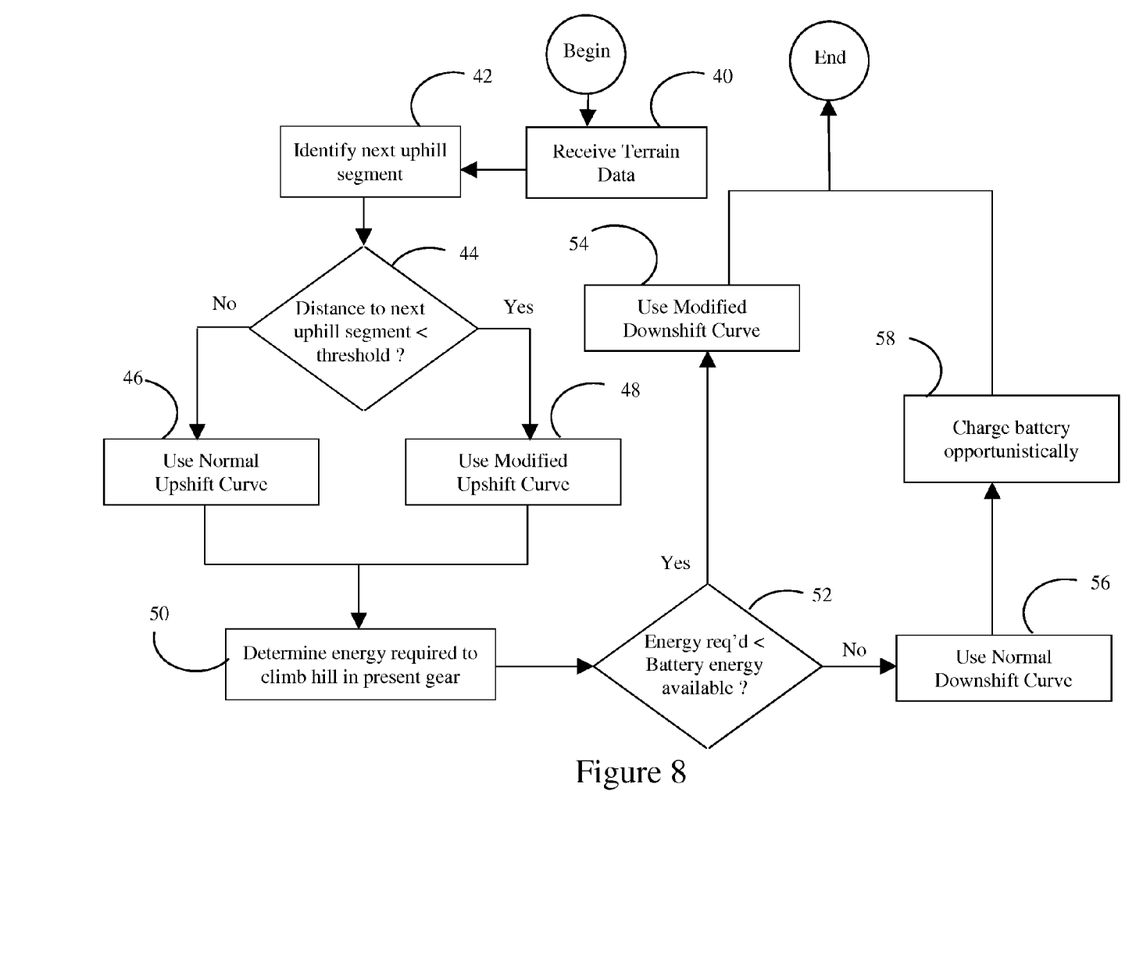
FIG. 8 is a flow chart showing steps for selecting among the shift curves illustrated in FIGS. 6 and 7.

A flow chart for the strategy is shown in FIG. 8. The steps in this flow chart would be repeated at regular intervals during vehicle operation. At step 40, the controller receives terrain data for the projected vehicle route. This data may come from an onboard GPS system, from data cloud, or from any other available source. At step 42, the controller utilizes this data to identify the next uphill segment. In steps 44, 46, and 48, the upshift curve is selected based on the distance to the beginning of that uphill segment. If the distance is short, the modified curve is selected inhibiting upshifts. Otherwise, the normal curve is selected. At step 50, the controller computes an estimate of the amount of battery energy required to ascend the hill without shifting. This estimate could be based on physical equation or could use simplified formulas or table lookups based on the grade and length of the hill. This estimate is compared to the current state of charge at step 52. If the battery has enough energy, then the modified downshift curve is selected at 54, inhibiting downshifts. Otherwise, the normal downshift curve is used at 56 and parameters that govern charging behavior are modified at step 58 such that the controller will increase the stored energy above the nominal level by increasing the engine power output and using the traction motor as a generator. After these steps are completed, the normal routines for shift scheduling and charge scheduling are performed.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a hybrid vehicle having a step ratio transmission, the method comprising:
by at least one controller,
receiving data indicative of a grade profile of an anticipated route;
adjusting first shift criteria for the transmission based on the received data to generate second shift criteria, wherein operating the transmission according to the first shift criteria as the vehicle travels over the anticipated route at a constant speed would result in an upshift and a downshift of the transmission; and
operating the transmission according to the second shift criteria without shifting the transmission as the vehicle travels over the anticipated route substantially at the constant speed.

2. The method of claim 1 wherein operating the transmission according to the first shift criteria as the vehicle travels over the anticipated route at a constant speed would result in an upshift followed by a downshift of the transmission.

3. The method of claim 2 wherein the shift criteria are adjusted only when an amount of energy available in a battery exceeds an estimated amount of electrical energy required to maintain vehicle speed in a present gear as the vehicle travels over the anticipated route.

4. The method of claim 3 further comprising, in response to data indicating an uphill grade in the anticipated route, operating a traction motor such that additional energy is stored in the battery.

5. The method of claim 1 wherein operating the transmission according to the first shift criteria as the vehicle travels over the anticipated route at a constant speed would result in a downshift followed by an upshift of the transmission.

6. A method of controlling a hybrid vehicle driveline comprising:

identifying future transmission upshift and downshift conditions based on shift criteria and road grade data describing a varying slope along a route; and in response to the conditions, adjusting the shift criteria and commanding an electric machine to increase torque output such that an upshift and a downshift of a transmission is precluded when the vehicle traverses the route at a substantially constant speed.

7. The method of claim 6 further comprising, in response to the conditions, commanding the electric machine to generate electricity before commanding the electric machine to increase torque output.

8. The method of claim 7 further comprising commanding an internal combustion engine to increase torque output while the electric machine is generating electricity.

9. The method of claim 6 wherein the step of commanding the electric machine to increase torque output is performed only if a state of charge of a battery exceeds a threshold charge.

10. The method of claim 9 further comprising commanding a downshift if the state of charge of the battery is less than the threshold charge.

11. The method of claim 9 wherein the threshold charge is based on a length of the uphill slope.

12. The method of claim 11 further comprising
identifying a second future transmission downshift condition, following the upshift condition, based on the road grade data; and
adjusting shift criteria such that the upshift is precluded when a distance or time between the upshift condition and the second future downshift condition is less than a threshold distance or threshold time respectively.

13. A hybrid vehicle comprising:
an engine having a driveshaft;
a fraction motor driveably connected to the driveshaft and electrically connected to a battery;
a shiftable transmission having an input driveably connected to the driveshaft and an output driveably connected to vehicle wheels; and
a controller programmed to
initiate transmission downshifts and upshifts based on a set of shift criteria,
identify a location of a future transmission downshift condition and a future transmission upshift condition based on the shift criteria and road grade data describing an uphill slope, and
adjust the shift criteria such that an upshift and a downshift is precluded when a distance to the location is less than a threshold distance.

14. The vehicle of claim 13 wherein the threshold distance is a function of a current speed of the vehicle.

15. The vehicle of claim 13 wherein the controller is further programmed to
execute an upshift when the distance to the location exceeds the threshold distance; and
in response to the future downshift condition, adjust the shift criteria and command the traction motor to increase torque output such that the downshift is precluded when the vehicle is ascending the uphill slope at a substantially constant speed.

16. The vehicle of claim 15 wherein the downshift is precluded only if an amount of energy available from the battery exceeds a threshold energy.

17. The vehicle of claim 16 wherein the threshold energy is based on a length of the uphill slope.

18. The vehicle of claim 16 wherein the controller is further programmed to, in response to the future downshift condition, command the traction motor to generate electricity before commanding the fraction motor to increase torque output.

19. The vehicle of claim 13 wherein the traction motor is driveably connected to the driveshaft by a disconnect clutch.

20. The vehicle of claim 13 wherein the transmission input is driveably connected to the driveshaft by a launch clutch.

* * * * *